Nov. 28, 1967   F. F. FERRARY ET AL   3,354,846
MOLDING APPARATUS
Filed July 3, 1964   6 Sheets-Sheet 1
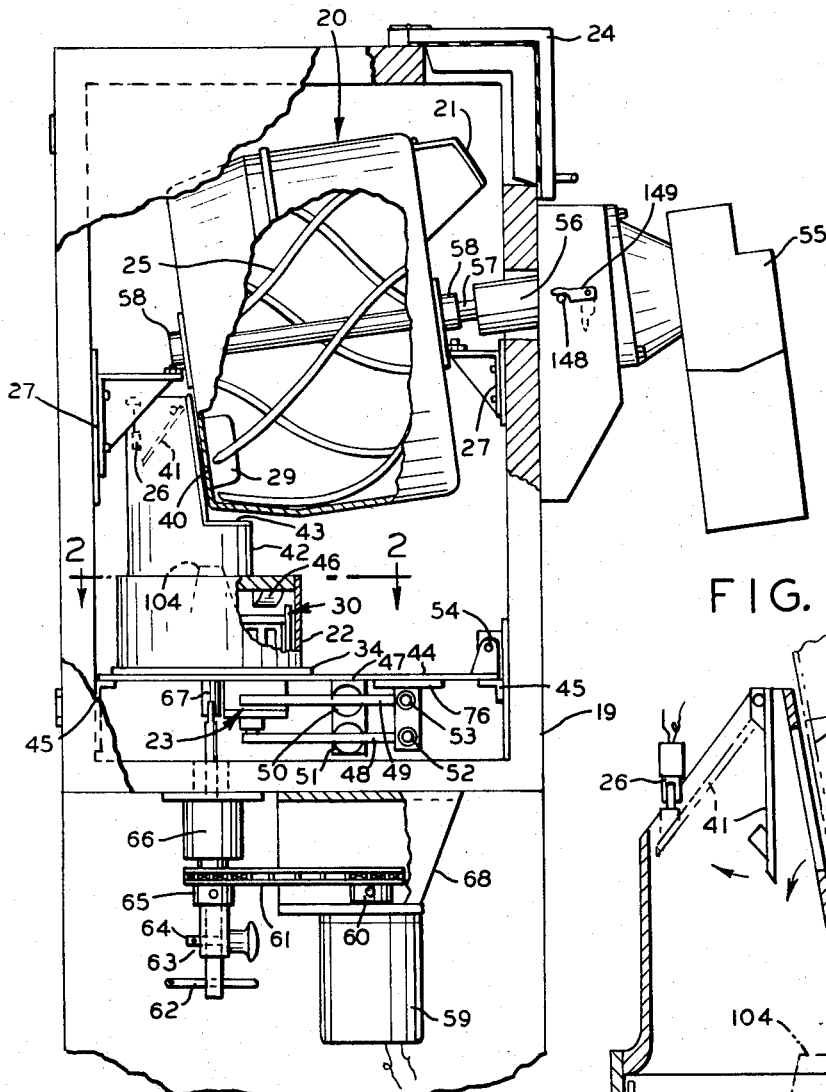
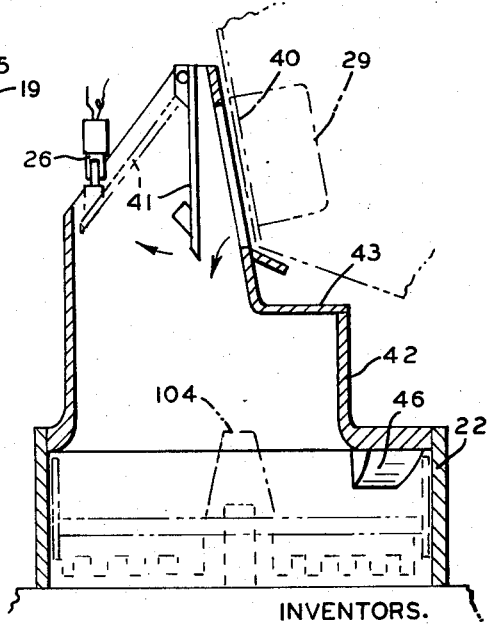
INVENTORS.
FERDINAND F. FERRARY.
GEORGE FELDSTEIN
ZYGMUNT DZIEKONSKI
MARIAN MARKOWICZ
STANLEY M. DOMBROSKI
BY: Arthur J. Plantamura
ATTORNEY.

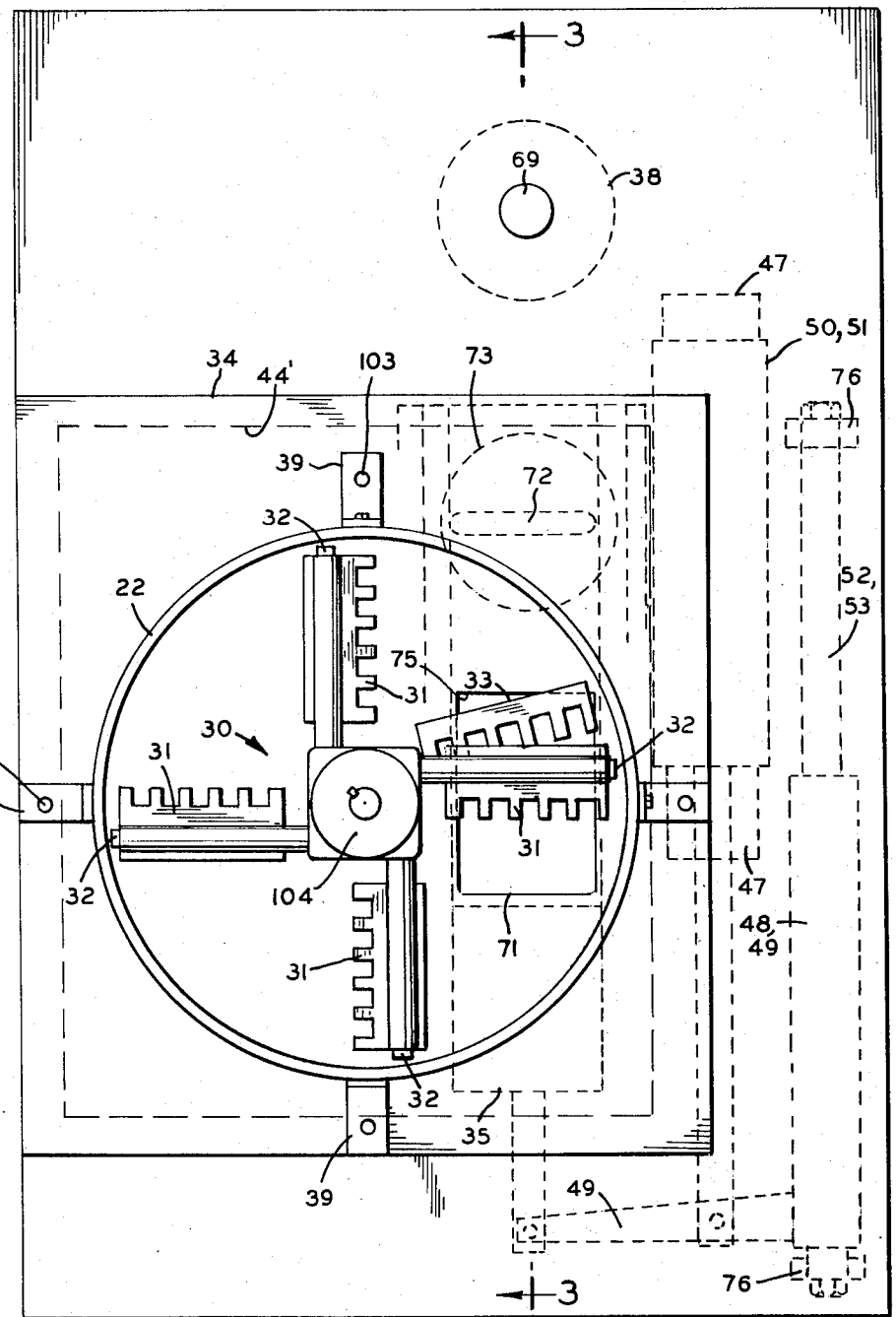

Nov. 28, 1967  F. F. FERRARY ETAL  3,354,846
MOLDING APPARATUS
Filed July 3, 1964  6 Sheets-Sheet 3
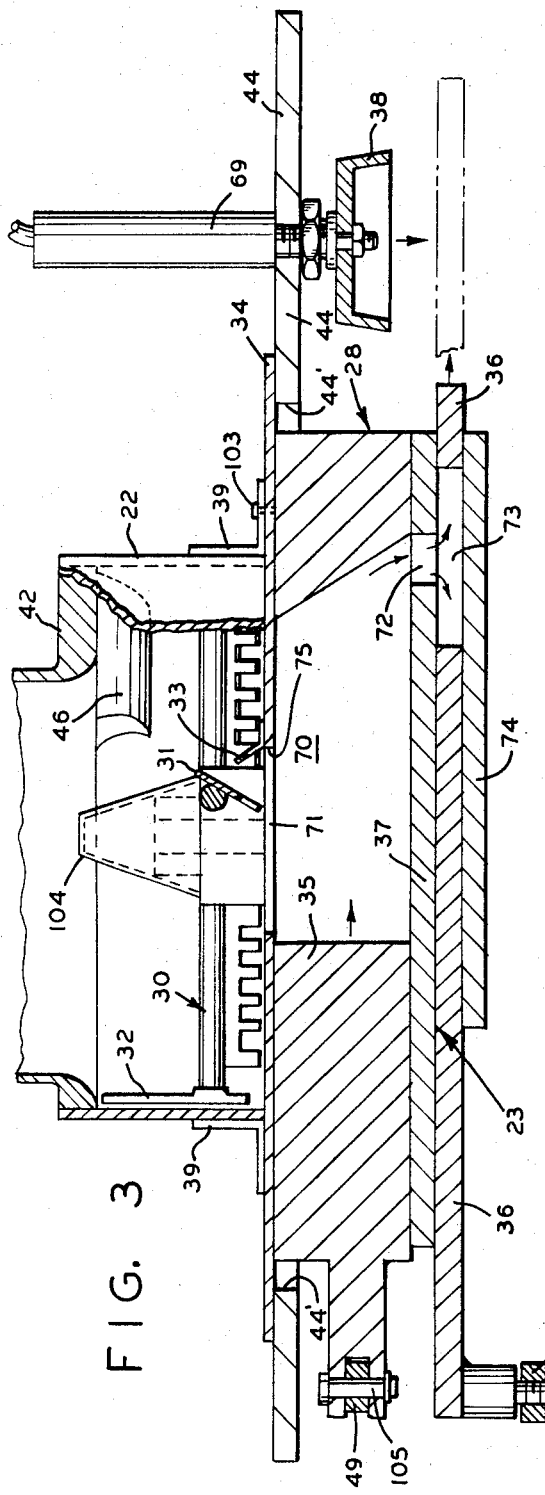
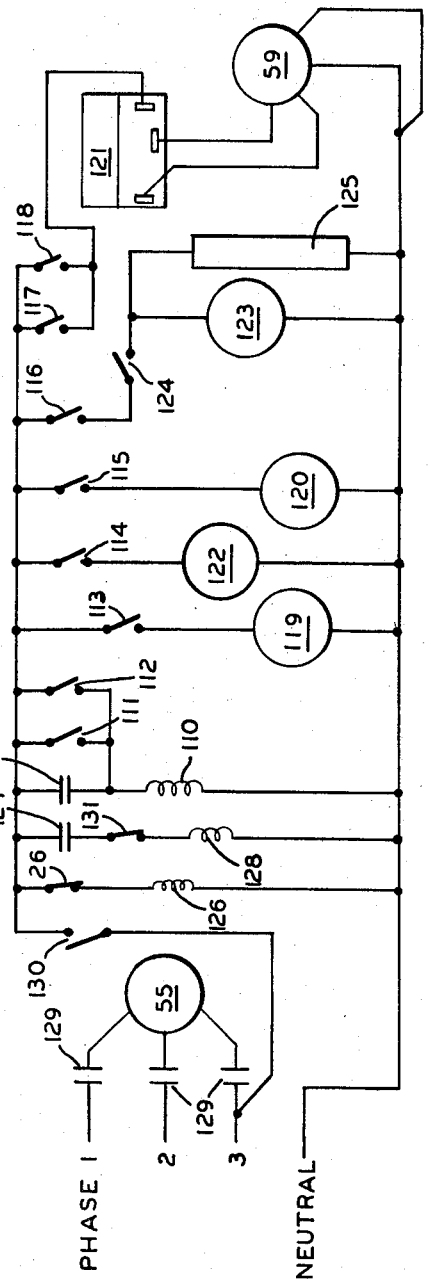
INVENTORS.
FERDINAND F. FERRARY
GEORGE FELDSTEIN
ZYGMUNT DZIEKONSKI
MARIAN MARKOWICZ
STANLEY M. DOMBROSKI
BY:
Arthur J. Plantamura
ATTORNEY.

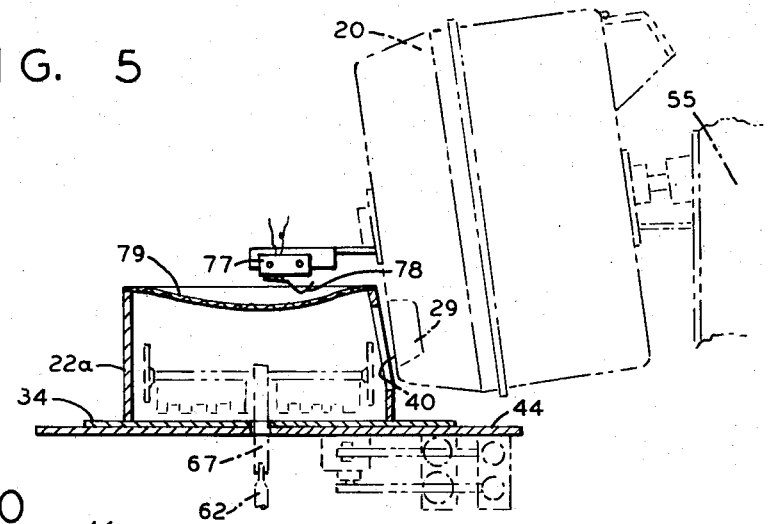
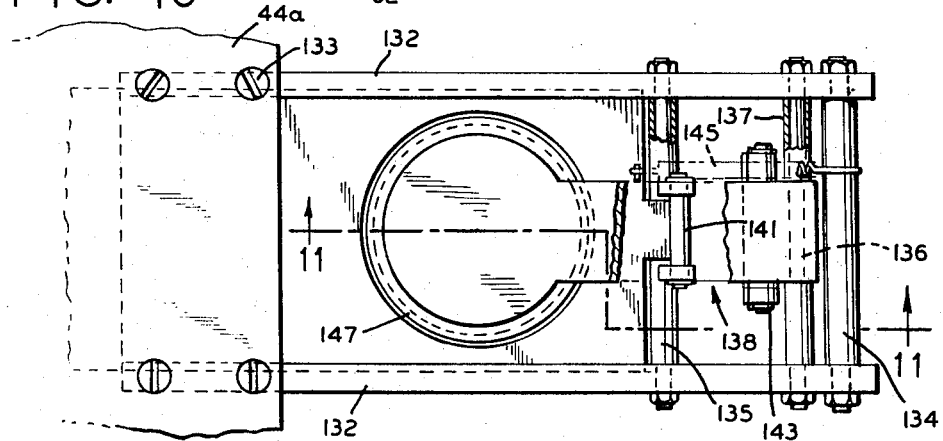
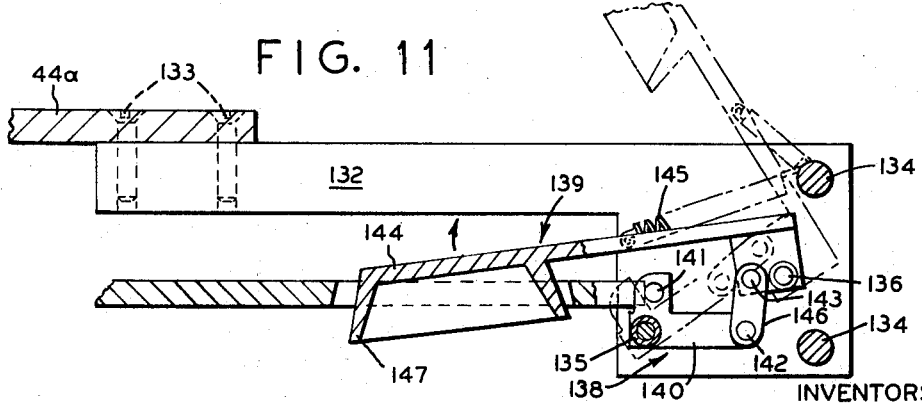

INVENTORS.
FERDINAND F. FERRARY
GEORGE FELDSTEIN
ZYGMUNT DZIEKONSKI
MARIAN MARKOWICZ
STANLEY M. DOMBROSKI

BY Arthur J. Plantamura
ATTORNEY.

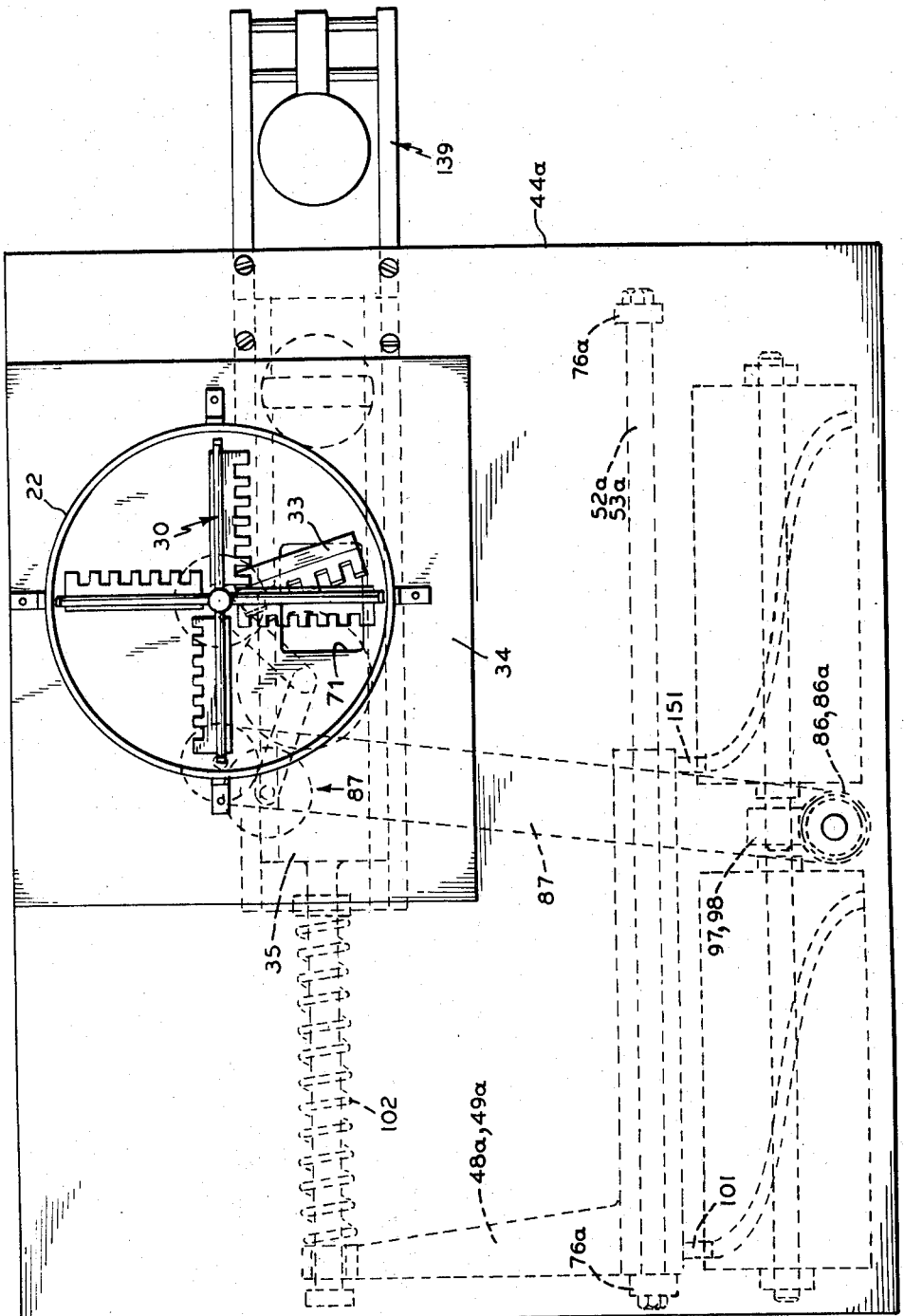

United States Patent Office

3,354,846
Patented Nov. 28, 1967

3,354,846
MOLDING APPARATUS
Ferdinand F. Ferrary, Springdale, and George Feldstein, Stamford, Conn., Zygmunt Dziekonski, Lake Mahopac, N.Y., and Marian Markowicz, Wilton, and Stanley M. Dombroski, Stamford, Conn., assignors to American Machine and Foundry Company, a corporation of New Jersey
Filed July 3, 1964, Ser. No. 380,158
25 Claims. (Cl. 107—15)

This invention relates to a patty forming machine and more particularly, to a machine which stores a quantity of material such as food, e.g. ground meat, dough, comminuted potatoes and the like, and including other moldable substances from which patties or other forms of a predetermined shape and weight may be molded. The machine of the present invention is operable to produce the shaped articles of food or other substance on demand, by withdrawing, compressing and shaping only a portion of the entire quantity of material stored in the reservoir of the machine.

The advantage of isolating and compressing only a small portion from the bulk of stored material resides in the fact that a smaller quantity only is disrupted for processing. This avoids repeated deteriorating in handling of the bulk and aids in maintaining a high quality in the material stored and subsequently dispensed. In the case of ground meat, for example, the repeated working and compressing of a bulk quantity or the retention under pressure of the meat for prolonged periods has a severe degrading effect on the product. This abuses the meat and undesirably affects the taste and fluffy texture of the molded meat patties.

A further advantage of the machine of the invention resides in the positive feed arrangement on demand which obviates "bridging" of the substance when a portion of the bulk is withdrawn. Due to the sticky texture the withdrawal during the feed tends to leave gaps or interruptions in the uniform flow. A continuously positive feeding in accordance with the arrangement of the invention results in an apparatus which is more efficient and dependable than machines designed for the same general purpose heretofore.

An additional feature of the present invention resides in the capability of operating the machine entirely automatically thereby enabling it to be coupled electronically into an automated ordering system such as that referred to, for example, in U.S. Patent No. 3,266,442 of H. N. Udall et al., issued on application Ser. No. 220,615, filed Aug. 31, 1962. Moreover, the apparatus of the present invention as described hereinbelow may be utilized as a self-contained unit or it may be used as a component part of the multi-operation machine disclosed in the aforementioned U.S. patent application. When used as a component element of that apparatus, it is employed to replace the mechanism in the refrigerated compartment 111 disclosed in that patent.

Summarized in brief, the invention comprises a patty-forming or shaping assembly in combination with a knockout element. The patty former assembly is surmounted by a hopper which contains a moderate quantity of material to be fed into the assembly. A storage container or reservoir which stores relatively large quantities of the patty producing material may optionally be used in conjunction with the patty forming assembly and hopper. When used with the reservoir, introduction of the material for the entire assembly is through the reservoir; when used without the reservoir, material is supplied directly into the hopper.

When the patty maker of the invention is in automated use, the assembly is preferably used in conjunction with the main reservoir to provide the optimum in non-attended functioning of the apparatus because of the large capacity of the reservoir. A transition segment between the main reservoir and the hopper may be conveniently used and facilitates assembly of the components. This transition segment also provides a means to incorporate a sensing device to control the quantity of the feed introduced into the hopper. The apparatus of the invention is highly advantageous because of various features which include on-demand capability, a means to move the entire mass to prevent juices or other ingredients from settling out while imparting a minimum of disruption or deterioration of the cellular structure of patty-forming material, application of pressure to only a small portion of the material fed; a positive feed which prevents bridging effect and economical dependable simplified operability.

It is the principal object of the invention to provide a patty-forming machine which assures a positive feed of the bulk material and which is capable of fully automated operation.

It is another object of the present invention to provide a machine capable of being fed from a large reservoir of material but offering a minimum of disruption of the material stored as the bulk of the material is fed.

It is another object of the invention to provide a patty molding machine which is capable of being conveniently and safely restocked while the machine is in operation and which utilizes the stored and/or fed stock on a first in, first out sequence.

It is a further object of the invention to provide an apparatus which permits the handling of large bulks of material and serves to inhibit the tendency of the ingredients in the material to settle out by means which agitate that material at a rate sufficient to prevent separation of ingredients.

Other objects and advantages of the invention will be apparent hereinafter from a discussion of the invention taken in connection with a detailed description of the drawings wherein:

FIG. 1 is a side elevational view partially in section of the entire patty molding assembly provided with a feed hopper and bulk meat dispenser containing additionally a main bulk storage container or reservoir.

FIG. 2 is a plan view in enlarged detail through the feed hopper taken substantially along line 2—2 of FIG. 1.

FIG. 3 is a sectional elevational view of the patty maker assembly taken substantially along 3—3 of FIG. 2.

FIG. 4 is an enlarged fragmentary sectional view of the transition section between the upper main storage container and the hopper.

FIG. 5 illustrates an alternate embodiment comprising another means for sensing the presence and absence of adequate amounts of material in the feed hopper and for responsively actuating introduction of feed.

FIG. 7 is a plan view of the drive mechanism for the alternate mechanical actuated patty maker of FIG. 6.

FIG. 10 is a plan view of an alternate knockout device, mechanical in operation, for the molded patty.

FIG. 11 is a side elevation sectional view of the knockout device of FIG. 10.

FIG. 12 is a schematic wiring diagram illustrating the interconnecting arrangement for the molding device of the invention.

Figure 6:
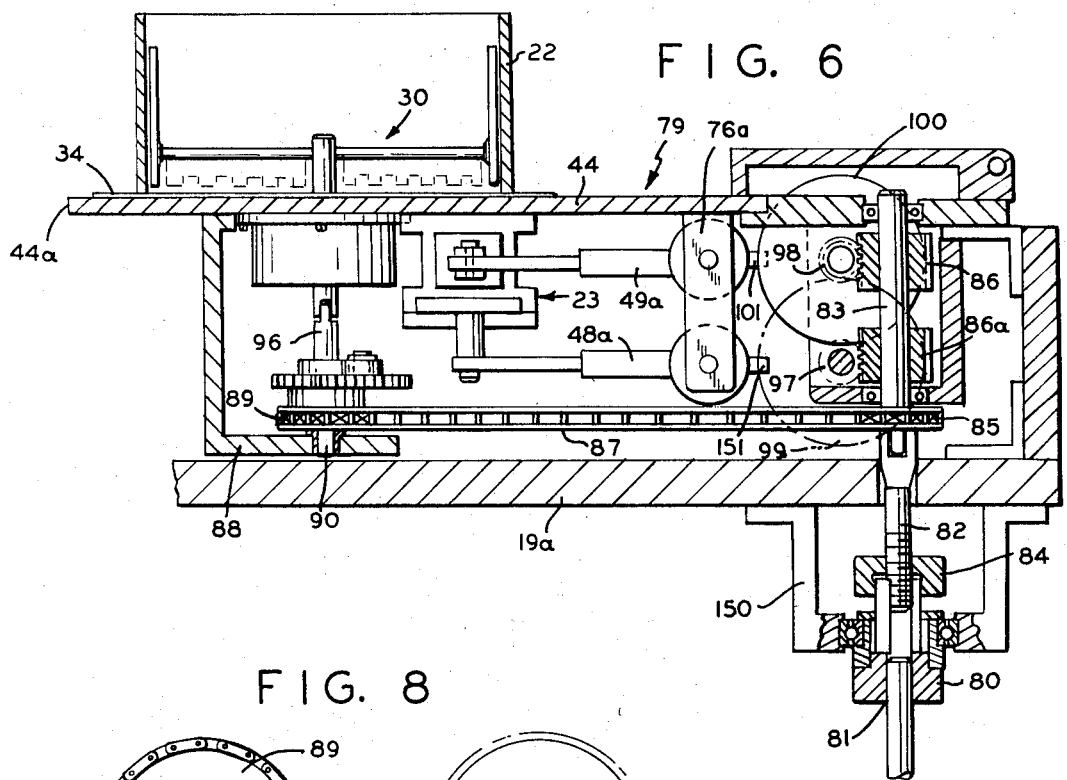
FIG. 6 is a sectional elevational view similar to FIG. 1 showing an alternate patty molding assembly utilizing instead of electrical and pneumatic means, an essentially mechanical arrangement.

While the machine of the invention may find utility in forming molded shapes from a variety of bulk material, the invention will be described in connection with a bulk meat dispenser to form hamburger patties which comprises the preferred utility for the invention. It will be understood, however, that the apparatus of the invention is not to be construed as restricted thereto, and that the apparatus herein described and claimed, with modifications apparent from the ultimate use to which the machine may be applied, may likewise be applied for molding shapes from various other substances including edible products for humans or for animals, e.g. biscuits as well as non-edible products, e.g. fertilizer pellets or combustible briquettes.

The dispenser of the invention generally comprises four components which are enclosed in a refrigerated compartment; a meat container assembly, a hopper section, a patty maker assembly and a main frame; and a drive and control system which preferably is positioned outside the refrigerated enclosure.

Referring to the drawings in detail, the invention comprises a refrigerator-like enclosure 19 which houses a main reservoir 20. This reservoir contains the main bulk of meat which is fed to a hopper 22 through a transition section 42. The transition section 42, the hopper 22 and the patty forming assembly 23 are supported by a main frame 44. Suitable drives 55 and 59 for the reservoir container 20 and patty forming assembly respectively are mounted at any convenient place externally of the refrigerated compartment. A transition segment generally referred to as 42, adapts the main feed reservoir 20 to the hopper 22 and contains a control element which controls the supply of material introduced from the reservoir into the hopper.

The meat container assembly 20 may be sized to have any adequate practical capacity such as a full day's supply or greater, i.e. up to about eighty pounds or even more if desired, to permit unattended use for the desired period. It is contemplated in the preferred embodiment of the invention that the entire capacity or amount can be dispensed unattended. Additional quantities can be fed into the reservoir 20 during operation, as well as when the machine is idle, through the container feed door 21 by opening the refrigerator enclosure feed hatch 24.

The agitator drive 55 for the main reservoir 20 is actuated through a meat storage demand switch 26 which senses the height of meat in the hopper transition segment 42 through the meat flapper 41. The reservoir or container which preferably does not rotate is suitably supported on brackets 27. Suitably journaled in bearings 58 mounted on supports 27 is a helical blender element comprising ribbons 25 mounted on shaft 57 which functions to gradually agitate the entire bulk of meat in reservoir 20 to prevent settling out of juices. The ribbons 25 are moved slowly to avoid undue handling and consequent shearing of the meat cell structure which generally occurs in handling meat. The arrangement of the feed mechanism of the invention is designed to minimize abuse of the meat while affording means to absorb juices which settle out from the mixture by gravity or osmosis. Rotation of the ribbons is controlled by any suitable switching device so that when the sensing switch 26 calls for more feed, the switching preferably includes a built-in time delay to prevent rapid on-off sequence. Drive 55 has a coupling 56, which engages shaft 57. Coupling 56 has a clutch portion (not shown) for fixedly connecting coupling 56 to shaft 57. Clutch (not shown) has a control rod 148 for actuating the clutch. Rod 148 has a latch 149 for locking rod 148 in an operating position.

As long as the height of meat in the transition section 42 is out of the range sufficient to actuate the meat storage demand switch will be fed out of the drum by virtue of the helical blender ribbons 25 inside the drum. These ribbons both rotate and advance the meat. The feed action continues until the meat storage demand switch 26 is actuated. When this occurs, feed from the drum container 20 is stopped preferably for the selected time delay, e.g. 10–30 seconds before movement of the ribbons 25 is again recommenced.

The movement of ribbons 25 is designed to result in a slowly rotating motion to insure minimum agitation in the drum while assuring positive feed of the meat into the auxiliary hopper. The positive feeding of the meat from container 20 is aided by a drum cam 29 suitably positioned against opening 40. The meat blending and feeding operation of the main drum is preferably independent of any signals or orders that come into the main system.

The transition section 42 contains a feed demand switching mechanism 26 and a flapper 41 arranged to work conjointly with the switch 26 to stimulate the feed of additional meat when the quantity in section 42 falls below a desired predetermined level. Any suitable alternate similarly functioning sensing mechanism known to those skilled in the art may be substituted. Transition section 42 also serves as the adapter between the container 20 and the hopper 22 surmounted on the patty forming assembly 28.

The hopper transition shown more clearly in the enlarged view of FIG. 4 fits up against the opening of the meat storage continer 20 and receives the meat therefrom. The unit is so designed such that all edges have generous radii and otherwise contoured so as to prevent difficulties arising from the meat sticking to the surfaces and restricting steady flow of the feed.

The hopper 22 mounted on the hopper plate 34 contains a ready supply of meat for the patty former and if desired may be used as the point of feed of meat for the machine. Thus, it will be apparent that the patty forming assembly can be used independently of the main storage drum 20 and transition segment 42 described hereinabove and may comprise a separate article of commerce where, for example, a machine which is hand fed is desired. The machine can function independent of container 20, for example, for times when the main drum is pulled out of the unit and cleaned whereupon the hopper 22 is used as the point of supply for sufficient meat to feed the molding unit for appreciable periods thereby avoiding inconvenience caused by shutdowns. The capacity of the hopper 22 may be any suitable volume and may, in the case of ground meat, be sized to hold approximately 20 pounds. If desired, the transition section 42 may be removable with the reservoir drum assembly 22 or it may be retained as a part of the hopper assembly 22.

The hopper section of the machine comprises the hopper container 22, the hopper feed directing cam 46 and a blade weldment 30 equipped on each of its arms with a comb-like arrangement. The cam 46 and weldment 30 function in conjunction with stationary stripper 33 in moving material from the hopper downward toward the main compression chamber 70. The arrangement is shown more clearly in FIG. 3. The downward positive flow of material, as the meat is rotated in the hopper 22 by blade weldment 30 and scraper arm 32, is promoted by a cam 46. Also, cam 46 is effective in preventing bridging as meat is withdrawn by the feed to chamber 70 by forcing the meat into the void created by feeding. The camming action creates a void on the top surface of meat in the hopper 22 aiding meat in flowing more positively from the transition section 42. A cone-shaped cap 104 in the hopper provides the securing means for the weldment 30 on its mounting and, as a consequence of its contour, prevents meat from settling on the center of the weldment.

Material stripped from the combs of the weldment 30 by stripper 33 through an opening 71 in the hopper plate 34 passes into the main compression chamber 70. On demand, the plunger 35 forces the meat through the discharge opening 72 in a plate 37 forming the bottom of chamber 70 into the mold cavity 73 formed in the mold plate or slide 36. A plate 74 forms the bottom surface of the cavity 73 when the mold slide 36 is in the cavity loading position.

The plunger 35 is connected at 105 to a suitable actuating means such as plunger slide bracket 49 which in turn is connected to an appropriate actuating mechanism, such as pneumatic cylinder 50 shown in phantom in FIG. 2, capable of imparting uniform pressure against material in chamber 70 independent of the volume of material therein as will be more fully described hereinafter. Frame 44 has a pair of brackets 47, which support cylinder 50, and also has another pair of brackets 76, wherein is slidably mounted the rod 53, that support slide bracket 49. The mold slide 36 is connected at 106 to a suitable actuating means such as slide bracket 48 and is actuated at the proper timing by the cylinder 51 (see FIG. 2) and carried to a position below a knock-out element 38. Brackets 47 also support cylinder 51, and brackets 76 slidably support the rod 52, that supports slide bracket 48. The knock-out unit comprises actuating element illustrated as 69 and a patty knock-out disk shaped element 38 attached to the rod of cylinder 69 which knocks the formed patty, at a timed sequence, from the cavity 73 when the cavity is appropriately positioned at a point below the disk 38. Refrigerator compartment 19 has a bracket 68 and a bearing 66, which are disposed at the underside thereof. Bracket 68 supports drive motor 59. Blade weldment 30 has a shaft 62, which is journaled in bearing 66. Drive motor 59 has a drive gear 60; and shaft 62 has a driven gear 65. Gears or sprockets 60, 65 are connected by a chain 61 whereby drive motor 59 rotates shaft 62. Gear 65 has a sleeve portion 63, which is fixedly connected to shaft 62 by a pin 64. Shaft 62 has an end portion 67, which is connected to the hub of blade weldment 30.

The blade weldment 30 in rotating functions through the scraper blades to break the meat away from the hopper walls. This action in itself prevents voids from forming on the lower strata of the hopper, a condition which would prevent sufficient meat from being fed into the compression area to form patties. The weldment causes the entire bulk of meat to be carried around eliminating relative motion between the weldment and the meat, thereby minimizing the agitation of the meat.

It should be noted here that while in the hopper section, the meat is subjected to conditions of somewhat greater handling than in the main drum, the handling is still not unduly severe. Also, the amount of meat being handled relative to the main bulk is substantially less. Moreover, full pressure is applied only to that portion of the meat from the hopper which is introduced into chamber 70.

The blade weldment 30 in the hopper 22 comprises rotating comb vanes 31 and a scraper arm 32 mounted to each of a plurality of arms of the weldment. In the embodiment illustrated four arms are employed. The combs of the weldment rotate through a stationary stripper bar 33 which is angled to direct feed downward into chamber 70. The stationary stripper bar 33 and the rotatable weldment 30 are suitably mounted on the hopper plate 34. On the underside of the hopper plate 34 there is mounted the main meat compression subassembly whose components are the main plunger 35, the mold plate 36, the plate 37 also forming the top of a mold channel whose bottom is formed by plate 74, the cam shaped end plug 28 of the compression chamber and the knock-out element 38. The hopper plate 34 supports the hopper section including the blade weldment on the top surface and the patty forming section on the bottom surface. The hopper plate and its components are so arranged so they are readily removed from the main frame 44 for easy cleaning.

Referring with greater particularity to the extruding and molding apparatus of the invention, the sliding mold plate 36 has a circular hole 73 but it may comprise other shaped cavities in it the size of the patty desired. This plate fits in a mold channel or chamber which is closely fitted on all sides, especially the top and bottom. Meat is injected into the cavity 73 in the plate through an aperture 72 which is connected to the compression chamber 70 directly above it. After the mold cavity 73 is filled by the compression plunger 35, pressure is maintained on the meat while the mold plate 36 slides into the discharge position and the knock-out mechanism comprising element 38 secured on the piston rod of pneumatic cylinder 69 removes the patty.

The horizontal compression chamber 70 which may be either cylindrical or rectangular, connects to a return passage 75. Stripper 33 is fixedly mounted on the top side of hopper plate 34, and is positioned diagonally across aperture 71 thereby forming passage 75. Passage 75 is disposed on the right side of stripper 33, as shown in FIG. 3. Passage 75 interconnects hopper 22 to chamber 70, and permits the return of excess material to hopper 22 from chamber 70. Portions of meat swept into the chamber by the blade weldment 30 are picked up by the plunger 35 and forced into the discharge end of the compression chamber. Excess meat by the arrangement of the invention is returned to the hopper 22 through passage 75, which is disposed adjacent to stripper 33, by the plunger 35 as it advances and before such excess enters the pressure chamber which commences at a point to the right of passage 75. This feature employs in conjunction therewith, a drive mechanism which maintains a constant pressure on the meat. The arrangement can thereby accommodate variations in the stroke of plunger 35. An air piston is admirably suited to this purpose.

In operation, the rotary blade weldment 30 is actuated for about 180° per patty to prevent overworking the meat. Metal comb vanes 31 on each arm of weldment 30 are inclined forward in the direction of motion and carry the meat around with them. The stationary comb 33, the stripper, is slanted in the opposite direction and attached to the bed plate 34 behind the feed chamber, and dovetails with the rotary comb vanes and strips the meat from them; the meat then flows downward into the compression chamber 70. In addition to the combs the arms have attached to their ends, vertical scraper arms 32, which project a distance above them. These scraper arms clear the meat from the vertical sides of the circular hopper 22 and allows the meat to rotate with the arms and permit the comb vanes to work more effectively.

A feature of particular significance in connection with the horizontal compression chamber which is constantly replenished and pressurizes only a portion of the meat, is that it does not necessarily empty with every patty but serves as a reservoir for a number of patties. This feature contributes greatly to the reliability of the system in delivering patties even though the rotary arms may have failed in a given pass to drop meat in the compression chamber during the 180° rotation. The variable stroke accommodates the random supply rate; the plunger stroke stops when a predetermined pressure is attained and when sufficient material has been introduced into the mold cavity 73. The advantage of this pressure system is that it allows complete patties to be made with any kind of meat and either on demand or at a constant rate.

The operation of the patty forming machine in accordance with the preferred embodiment of the invention may be summarized as follows:

The sequence of steps is controlled through a suitable timed actuating system initiated by an incoming signal. Meat is carried around by the blade weldment 30 and cammed down by the stationary stripper 33 through the opening in the hopper plate into the main compression chamber 70. the plunger 35 then compresses the meat forcing the meat through an aperture 72 into the mold plate cavity 73. Pressure is maintained, while the mold plate 36 moves forward, long enough to insure molding of perfect shaped products. At the end of the stroke the knock-out cylinder 69 is actuated at the proper time and knocks the patty which has been formed in the mold plate on a conveyor or other arrangement which leads to a cooking grill or other processor or as described in the above noted U.S. Patent No. 3,266,442, onto the bands of a hamburger cooking and sandwich assembling machine.

The main frame 44 of the machine is provided with cutout 44′ and supports the patty forming assembly and mechanism actuating the plunger and knock-out arrangement. The patty forming assembly is supported by the hopper plate 34 and can be removed enmasse from the main frame. This is done by removing the hopper section from the top and the compression assembly area from the bottom. The hopper is removed from the top of hopper plate by unscrewing hopper bracket screws 103. Blade weldment is removed by unscrewing the weldment cone nut 104. The plunger is tied to the main frame by means of pin 105 through actuating cylinder 50 and its arm 49; the mold plate is similarly secured by pin 106 to the underside of the frame 44 through cylinder 51 and its arm 48.

The patty making section is suitably fastened to the underside of the hopper plate as by means of removable machine screws. The hopper plate 34 is likewise fastened by screw 103 to the top side of the main frame 44.

The main frame 44 can be pivoted about hinge 54. Frame 44 rests on brackets 45, which are fixedly connected to refrigerator 19, as shown in FIG. 1. Hinge 54 can be disassembled whereby frame 44 can be retracted from refrigerator 19. Before retracting frame 44, screws 103 and hopper plate 34 are separated from frame 44 and removed from refrigerator 19. This facilitates ease of cleaning and servicing of the machine.

The embodiment of FIG. 5 illustrates a modified transitional segment situated between the reservoir and the patty assembly hopper. Similar reference numerals are employed to show components similar to those illustrated in FIG. 1. In essence, the arrangement of FIG. 5 utilizes a flexible membrane over the hopper of the transition section. As the hopper 22a is filled by material passing from reservoir 20 through opening 40, the membrane 79 is lifted into contact with switch actuator arm 78 and through electrical connection of switch 77 interrupts feed of material from reservoir 20. After an appropriate time delay (or by use of a low limit switch not shown) and when the level of material in hopper 22a has receded, the feed of material into the hopper 22a again commences.

Figure 8:
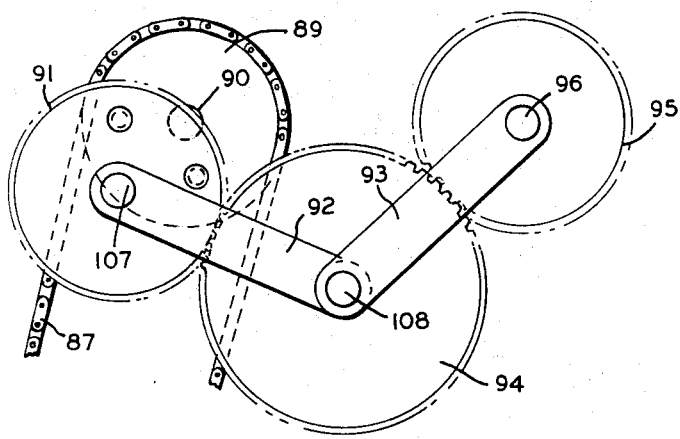
FIG. 8 is a plan view of the 3-gear drive arrangement of FIG. 9.
Figure 9:
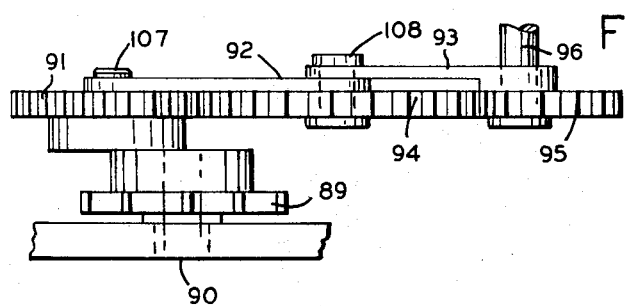
FIG. 9 is an enlarged fragmentary view of the 3-gear drive of the arrangement of FIG. 6.

By reference to FIGS. 6–11, an alternate embodiment of the invention wherein mechanical actuating means is used in lieu of the pneumatic and electrically actuated system of FIGS. 1–4 is described. Common reference numerals are employed for components functioning similarly to those of FIGS. 1–4. Power from a suitable source is delivered externally at 81 to provide drive at appropriate speed, e.g. about 20 r.p.m., to the patty maker through a suitable connector such as a one revolution clutch 80. The clutch 80, normally disengaged, is engaged by a convenient means, such as by an electronically initiated incoming order signal, and drives the slotted shaft 82 which in turn drives shaft 83. Shaft 82 can be retracted from contact with the tongued drive shaft 83 by rotating the hand nut 84. The clutch 80 is mounted within a housing 150 and conveniently secured as on the bottom of the refrigerator compartment 19a shown in FIG. 6. On the tongued drive shaft 83 are mounted a drive sprocket 85 and two helical drive gears 86 and 86a.

The sprocket 85 by means of a chain 87 in turn drives a sprocket-driven 3-gear-drive system mounted by means of a gear-drive bracket 88 on the underside of the frame 44a. The three-gear-drive consists of a driven sprocket 89 which rotates about a fixed pivot 90. The three-gear-drive also consists of an eccentric gear 91 which is fixedly connected to sprocket 89 eccentric thereto for planetary rotation about fixed pivot 90, a gear 95 with a fixed drive shaft 96 that is connected to blade weldment 30, and an idle gear 94 which is disposed between and which meshes with gears 91, 95 for rotating gear 95 and blade weldment 30. Gear 94 has a supporting pivot shaft 108, which is supported by a pair of hinged link arms 92, 93. Links 92, 93 are supported by shaft 107 at one end and by shaft 96 at their opposite end. Links 92, 93 have a hinge-type connection at their center span, which supports shaft 108.

By means of the above-described system or configuration, drive gear 95 and thus hopper shaft 96 which is connected to the blade weldment 30 go through the intermittent motion previously furnished through electrical controls in the embodiment of FIGS. 1–4.

Referring back to the tongued drive shaft 83 and to the two helical gears 86 and 86a mounted thereon, the lower gear 86a drives its mating gear 97 which in turn rotates a slide barrel cam 99. Likewise, an upper helical gear 98 driven by gear 86 rotates the plunger barrel cam 100.

These barrel cams 99 and 100 in turn supply the motion for the mold slide bracket 48a and plunger slide bracket 49a through cam followers 151 and 101, respectively, which as illustrated in the embodiment of FIGS. 1–4, are alternately actuated by the air cylinders 50 and 51. Frame plate 44a has a pair of spaced brackets 76a, which support a pair of substantially parallel elongate rods 52a, 53a that respectively support slide brackets 48a, 49a. In the mechanical alternate of FIGS. 6–11, the only difference being that the plunger 35 is driven by the bracket through a spring 102; this spring furnishes the predetermined pressure on the meat and variable stroke alternately furnished by the air cylinder in the pneumatic actuated embodiment.

The plunger cylinder 50 and mold slide cylinder 51 are suitably supported on the main frame by brackets 47 and function to drive the plunger 35 and slide 36 respectively through slide brackets 48 and 49 which ride along slide shafts 52 and 53 which again are supported through brackets 76 mounted under the main frame.

The main frame can be pulled out and rotated about the pivot block 54. This feature assists in facilitating cleansing of the assembly.

FIGS. 10 and 11 show the mechanical version of the patty knock-out. They consist of the following elements: knock-out brackets 132 which are fastened to the main frame 44 by means of screw 133. These brackets are held apart and parallel by means of the tie bars 134. Supported in the brackets there are two pivot shafts. The bumper pivot 135 and the knock-out arm pivot 136 carry mounted thereon four spacers 137. These spacers center the position of bumper assembly 138 and the knock-out assembly 139. The bumper assembly 138 consists of the bumper bell crank 140, the bumper rod 141 and the link pivot 142.

The knock-out assembly 139 consists of knock-out link pivot 143, the knock-out bar 144 and the spring 145 and the knock-out cup 147. Two links 146 fit on pivots 142 and 143.

The arrangement operates as follows: As the mold slide 36 approaches the end of its stroke, i.e. within about ¼ inch to about ⅛ inch of the final position, it strikes the bumper rod 141 as illustrated in the phantom position. This causes the bumper assembly 138 to rotate about fixed pivot 135. In turn this pulls the knock-out assembly 139 around by the action transmitted through the links 146. The movement is such that as a result of a small actuating motion, a magnified impact motion results. The effect causes the knock-out cup 147 to strike the patty in the mold cavity of the mold plate with sufficient force and velocity to knock it out. The spring 145 returns the knock-out assembly 139 to the "up" position when the slide mold 36 retracts.

A suitable control system for the apparatus of the invention will be described in connection with the diagram of FIG. 12. As a result of the incoming signal order relay contact 109 is closed. This actuates the 3 second timer start coil 110. Coil 110 can likewise be actuated by manual switch 111 or automatic switch 112. The latter switch when actuated at timed intervals by a conventional timer (not shown) will cause the patty maker to produce a patty every cycle. In this case, every three seconds. This gives the machine the added capability of being a batch patty maker in addition to being an on-demand patty maker.

Coil 110 actuates switch 113 which in turn starts 3 seconds timing motor 119 (which goes through one revolution at which time it opens switch 113) and the following chain of events occurs. The plunger valve solenoid 120 is actuated through switch 115. Valve solenoid 120 actuates plunger cylinder 50, which actuates slide bracket 49 that connects to plunger 35 thereby advancing the plunger and compressing the meat in the compression chamber holding it in this position for a brief time, e.g. approximately 1½ seconds. Prior to that time, the hopper drive motor 59 driving the blade weldment is actuated by switch 117 in conjunction with relay 121 and feeds meat before and while the plunger is still advancing and has not yet sealed off the hopper plate opening. The mold slide valve solenoid 122 is similarly actuated by switch 114. Valve solenoid 122 actuates mold slide cylinder 51, which actuates slide bracket 48 that connects to mold slide 36 whereby the mold slide moves forward during the meat compressing time interval. Control for the movement is through timing switch 114. The plunger is still compressing meat while the mold slide is advancing. The cylinder 69, which is partly actuated by switch 116, will not be finally actuated, however, until the slide reaches the end of its forward stroke. At that point it strikes the patty knock-out interlock switch 124 which actuates valve 123 and cylinder 69 whereby knock-out cup 38 removes the patty. At this point a patty counter 125 records the number of patties. As the plunger commences its return stroke and reopens the hopper plate opening the motor 59 driving the blade weldment is again energized by switch 118 this time. This then feeds more meat into the compression chamber.

The control of the drum drive is independent of the previously described system. For this component, meat storage demand switch 26 which is normally closed controls the action as follows: When open, switch 26 actuates the time delay relay 126 which in turn opens the time delay relay contact 127 for a predetermined time interval. Switch 26 is opened by flapper 41, which is actuated by an excess volume of meat in hopper segment 42. The opening of contact 127 causes drum motor contactor 128 to open which in turn opens its contacts 129 and stops the drum motor 55.

Included in the system are two additional switches, the main or master control switch 130, and the meat storage interlock switch 131 which stops the drum drive when the refrigerator door is open to insure safe feeding.

It will be apparent to those skilled in the art that various modifications may be made in the invention without departing from the scope of the invention. Accordingly, the invention is not to be limited except insofar as necessitated by the appended claims.

What is claimed is:

1. A molding apparatus comprising: a base plate; a hopper mounted adjacent one side of said base plate for feeding material through said plate; a compression chamber on the opposite side of said base plate from said hopper and communicating on one side of said compression chamber with the hopper through an aperture in the base plate and on the other side with a discharge opening; a slidable mold plate having a hole therein which forms a mold cavity which is in intermittent communication with and is fed from said compression chamber; a plunger for compressing the material in said chamber whereby material fed into the compression chamber is forced through the opening in opposite side of said chamber and into the mold cavity; means to slide said mold plate from a fill position, in registration with said opening to the compression chamber to a mold evacuation position and back again; and a knock-out element operable to remove the molded patty from the mold cavity hole in the slidable mold plate when said plate is disposed in the mold evacuation position; said hopper being provided with a positive feed means to direct the material from the hopper through said aperture in the base plate to the compression chamber; a refrigerator structure supporting said base plate and having a compartment enclosing said base plate, said hopper, said compression chamber and said slide plate; and means including a drive disposed on the outside of said compartment for actuating, in operable sequence, said plunger, mold plate and knock-out element.

2. A molding apparatus comprising: a substantially horizontal base plate; a hopper mounted upon one side of said base plate; a compression chamber below said base plate and communicating at the top of said compression chamber with said hopper through an aperture in said base plate and at the bottom of said compression chamber with a discharge opening; a slidable mold plate below said compression chamber and having a hole therein which forms a mold cavity which is in intermittent communication with said compression chamber; a plunger for compressing the material in said chamber whereby material fed in through the top of the compression chamber is forced through the opening in the bottom of said chamber and into the mold cavity; means to slide said mold plate from a fill position, in registration with said opening in the bottom of the compression chamber, to a mold evacuation position and back again; and means comprising a knock-out element which operates to remove the molded patty from the mold cavity hole in the slidable mold plate when said plate is disposed in the mold evacuation position; said hopper being provided with a rotatable weldment comprising a plurality of arms extending over substantially the cross-sectional area of said hopper, said arms having angularly disposed fingers tending to direct material, within said hopper, downward; a stationary stripper plate cooperating with said rotatable weldment for separating material from said fingers and to direct the material through said aperture from the bottom of the hopper; and means for rotating said weldment and for actuating, in operable sequence, said plunger, mold plate and knock-out element.

3. A molding apparatus comprising: a substantially horizontal base plate; a hopper mounted upon one side of said base plate; a compression chamber below said base plate and communicating at the top of said compression chamber with said hopper through an aperture in said base plate and at the bottom of said compression chamber with a discharge opening; a slidable mold plate below said compression chamber and having a hole therein which forms a mold cavity which is in intermittent communication with said compression chamber; a plunger for compressing the material in said chamber whereby material fed in through the top of the compression chamber is forced through the opening in the bottom of said chamber and into the mold cavity; said compression chamber having a capacity of more than the mold cavity; means for actuating the plunger with uniform pressure so that material is fed to the mold cavity on each charge in substantially similar amounts and with substantially similar quantity of material independent of the quantity in the compression chamber; means to slide said mold plate from a fill position, in registration with said opening in the bottom of the compression chamber; to a mold evacuation position and back again; and means comprising a knock-out element which operates to remove the molded patty from the mold cavity hole in the slidable mold plate when said plate is disposed in the mold evacuation position; said hopper being provided with a rotatable weldment comprising a plurality of arms extending over substantially the cross-sectional area of said hopper, said arms having angularly disposed fingers tending to direct material, within said hopper, downward; a stationary stripper plate cooperating with said rotatable weldment for separating material from said fingers and to direct the material through said aperture from the bottom of the hopper; and means for rotating said weldment and for actuating, in operable sequence, said plunger, mold plate and knock-out element.

4. The apparatus of claim 3 in which said hopper is further provided with a camming element disposed over said weldment and tending to direct material introduced into the hopper downward and into engagement with said weldment.

5. The apparatus of claim 3 wherein the top of the compression chamber is provided with a material feed excess return so that when feed in excess of a predetermined quantity is introduced into said chamber said excess is returned to the hopper.

6. The apparatus of claim 3 wherein the plunger is pneumatically actuated.

7. A molding apparatus comprising: a reservoir for containing bulk material to be molded; a dispensing opening formed in said reservoir; a rotatable helical blender element in said reservoir arranged to gradually agitate substantially the entire mass of material in said reservoir and to convey said material toward said reservoir opening; a substantially horizontal base plate; a hopper mounted upon one side of said base plate into which material is received from said reservoir opening; a compression chamber below said plate and communicating at the top of said compression chamber with said hopper through an aperture in said base plate and at the bottom of said compression chamber with a discharge opening; a slidable mold plate below said compression chamber and having a hole therein forming a mold cavity which is in intermittent communication with said compression chamber through the discharge opening in the bottom of said chamber; a plunger for compressing the material in said chamber whereby material fed in through the top of the compression chamber is forced through the opening in the bottom of said chamber and into the mold cavity; means to slide said mold plate from a fill position in registration with said opening in the bottom of the compression chamber to a mold evacuation position and back again; a knock-out element operable to remove the molded patty from the mold cavity hole in the slidable mold plate when said plate is disposed in the mold evacuation position; said hopper being provided with a rotatable weldment comprising a plurality of arms extending over substantially the cross-sectional area of said hopper, said arms having angularly disposed fingers tending to direct material within said hopper downward; a stationary stripper plate cooperating with said rotatable weldment for separating material from said fingers and to direct the material through said aperture from the bottom of the hopper; and means for rotating said weldment and for actuating in operable sequence, said plunger, mold plate and knock-out element.

8. A molding apparatus comprising a reservoir for containing bulk material to be molded, a dispensing opening formed in said reservoir, a rotatable helical blender element in said reservoir arranged to gradually agitate substantially the entire mass of material in said reservoir and to convey said material toward said reservoir opening, a substantially horizontal base plate, a hopper mounted upon on side of said base plate into which material is received from said reservoir opening, a compression chamber below said plate and communicating at the top of said compression chamber with said hopper through an aperture in said base plate and at the bottom of said compression chamber with a discharge opening; a slidable mold plate below said compression chamber and having a hole therein forming a mold cavity which is in intermittent communication with said compression chamber through the discharge opening in the bottom of said chamber, a plunger for compressing the material in said chamber whereby material fed in through the top of the compression chamber is forced through the opening in the bottom of said chamber and into the mold cavity; said compression chamber having a capacity of more than the mold cavity; means for actuating the plunger with uniform pressure so that material is fed to the mold cavity on each charge in substantially similar amounts and with substantialy similar quantity of material independent of the quantity in the compression chamber; means to slide said mold plate from a fill position in registration with said opening in the bottom of the compression chamber to a mold evacuation position and back again; and means comprising a knock-out element which operates to remove the molded patty from the mold cavity hole in the slidable mold plate when said plate is disposed in the mold evacuation position; said hopper being provided with a rotatable weldment comprising a plurality of arms extending over substantially the cross-sectional area of said hopper, said arms having angularly disposed fingers tending to direct material within said hopper downward; a stationary stripper plate cooperating with said rotatable weldment for separating material from said fingers and to direct the material through said aperture from the bottom of the hopper; and means for rotating said weldment and for actuating in operable sequence, said plunger, mold plate and knock-out element.

9. The apparatus of claim 7 further provided with a transition segment between said reservoir and said hopper, said transition segment comprising a container area and a quantity sensing element for electrically feeding and stopping the feed of material when the supply in the hopper falls outside a predetermined limit.

10. The apparatus of claim 8 wherein the top of the compression chamber is provided with a material feed excess return so that when material in excess of a predetermined quantity is introduced into said chamber said excess is returned to the hopper.

11. The apparatus of claim 8 wherein the plunger is pneumatically actuated.

12. A molding apparatus comprising:
- a hopper having a longitudinal axis and a peripheral wall with a radially inner surface and a pair of axially-spaced end walls;
- a compression chamber communicating on one side of said compression chamber with the hopper through an aperture and on the other side with a discharge opening;
- a movable mold member having a hole therein which forms a mold cavity which is in intermittent communication with and is fed from said compression chamber;
- a plunger for compressing the material in said chamber whereby material fed into the compression chamber is forced through the discharge opening in the opposite side of said chamber and into the mold cavity;
- said movable mold member being displaceable from a fill position, in registration with said opening to the compression chamber to a mold evacuation position and back again; and
- a rotatable stirring and feeding means disposed in said hopper to direct the material from the hopper through said aperture into said compression chamber, said means comprising a plurality of arms rotatable about said hopper axis, said arms having respective scraper bars disposed adjacent to said inner surface and mounted on said arms.

13. A molding apparatus comprising:
a hopper;
a compression chamber communicating on one side of said compression chamber with the hopper through an aperture and on the other side with a discharge opening;

a movable mold member having a hole therein which forms a mold cavity which is in intermittent communication with and is fed from said compression chamber;

a plunger for compressing the material in said chamber whereby material fed into the compression chamber is forced through the discharge opening in the opposite side of said chamber and into the mold cavity;

said movable mold member being displaceable from a fill position, in registration with said opening to the compression chamber to a mold evacuation position and back again; and a rotatable stirring and feeding means disposed in said hopper to direct the material from the hopper through said aperture into said compression chamber, in which said rotatable stirring and feeding means includes:

a rotatable member disposed in said hopper having a plurality of arms extending over substantially the cross-sectional area of said hopper, said arms having angularly disposed fingers tending to direct material toward said aperture; and a stationary stripper plate cooperating with said rotatable arms for separating material from said fingers and to direct the material through said aperture.

14. A molding apparatus comprising:

a hopper;

a compression chamber communicating on one side of said compression chamber with the hopper through an aperture and on the other side with a discharge opening;

a movable mold member having a hole therein which forms a mold cavity which is in intermittent communication with and is fed from said compression chamber;

a plunger for compressing the material in said chamber whereby material fed into the compression chamber is forced through the discharge opening in the opposite side of said chamber and into the mold cavity;

said movable mold member being displaceable from a fill position, in registration with said opening to the compression chamber to a mold evacuation position and back again; and a rotatable stirring and feeding means disposed in said hopper to direct the material from the hopper through said aperture into said compression chamber, in which said hopper is further provided with an element coacting with said rotatable member and tending to direct material introduced into the hopper toward and into engagement with said rotatable member.

15. The apparatus of claim 12, wherein the compression chamber is provided with a material feed excess return passage so that when feed in excess of a predetermined quantity is introduced into said chamber said excess is returned to the hopper.

16. A molding apparatus comprising:

a reservoir with a longitudinal axis fixedly mounted on a support and having axially-spaced openings, one of said openings being a discharge opening, the other of said openings being an intake opening for containing bulk material to be molded;

a blender element in said reservoir;

means for activating said element relative to said fixed reservoir to agitate substantially the entire mass of material in said reservoir and to convey said material from said intake opening to said discharge opening and out of said reservoir;

a hopper into which material is delivered from said reservoir;

a molding unit for forming molded portions of said material;

a rotatable stirring and feeding mechanism disposed in said hopper;

means for actuating said mechanism to feed material from said hopper into said molding unit; and means for operating said unit to form said molded portions.

17. A molding apparatus comprising:

a reservoir for containing bulk material to be molded;

a blender element in said reservoir;

means for activating said element to agitate substantially the entire mass of material in said reservoir and to convey said material out of said reservoir;

a hopper into which material is delivered from said reservoir;

a molding unit for forming molded portions of said material;

a rotatable stirring and feeding mechanism disposed in said hopper;

means for actuating said mechanism to feed material from said hopper into said mechanism; and means for operating said unit to form said molded portions, and including:

means for operating said blender element; and control means for actuating said last-named means when material in said hopper reaches a predetermined limit.

18. The apparatus of claim 17, in which said molding unit includes:

a compression chamber communicating on one side of said compression chamber with said hopper through an aperture and on the other side of said compression chamber with a discharge opening; and a movable mold member having a hole therein forming a mold cavity which is in intermittent communication with and which is fed from said compression chamber through the discharge opening in the other side of said chamber.

19. The apparatus of claim 18, wherein the compression chamber is provided with a material feed excess return passage so that when material in excess of a predetermined quantity is introduced into said chamber said excess is returned to the hopper.

20. A device of the type described comprising:

a mold block having walls together forming a mold cavity;

an injector having a cylinder with a piston enclosed therein forming a variable-volume chamber and having an outlet passage interconnecting said chamber to said cavity;

a hopper having a peripheral wall with a longitudinal axis and with a radially inner surface enclosing a storage space with an outlet passage connecting to said cylinder chamber;

a rotatable device mounted in said hopper for stirring material disposed in said storage space and for urging a portion thereof through said outlet passage into said cylinder chamber; said device having a plurality of arms rotatable about said hopper axis, said arms having respective scraper bars disposed adjacent to said inner surface and mounted on said arms; and means for operating said rotatable device.

21. A device as claimed in claim 20, including an element in said hopper mounted above said outlet passage and coacting with said rotatable device to direct material advanced by said device downwardly into said passage.

22. A device of the type described comprising:

a mold block having walls together forming a mold cavity;

an injector having a cylinder with a piston enclosed therein forming a variable-volume chamber and having an outlet passage interconnecting said chamber to said cavity;

a hopper having a storage space with an outlet passage connecting to said cylinder chamber;

a rotatable device mounted in said hopper for stirring material disposed in said storage space and for urging a portion thereof through said outlet passage into said cylinder chamber; and means for operating said rotatable device, wherein said variable-volume chamber is provided with a downwardly inclined front wall adjacent said chamber outlet passage, said front wall coacting with said piston to direct said material downwardly into said cavity.

23. A device as claimed in claim 20, in which said injector cylinder also has a return passage disposed between said passage from said hopper and said outlet passage to said cavity for recirculating a portion of the material back to the hopper.

24. A device of the type described comprising:
a mold block having walls together forming a mold cavity;
an injector having a cylinder with a piston enclosed therein forming a variable-volume chamber and having an outlet passage interconnecting said chamber to said cavity;
a hopper having a storage space with an outlet passage connecting to said cylinder chamber;
a rotatable device mounted in said hopper for stirring material disposed in said storage space and for urging a portion thereof through said outlet passage into said cylinder chamber; and
means for operating said rotatable device, wherein said device includes at least one rotatable arm having a comb-shaped member having spaced teeth pointing downwardly toward said hopper outlet passage, and in which said hopper has a similar comb-shaped member fixedly mounted above said hopper outlet passage having spaced teeth pointing upwardly away from said hopper outlet passage for cooperation with said rotatable comb.

25. A device of the type described comprising
a mold block having walls together forming a mold cavity;
an injector having a cylinder with a piston enclosed therein forming a variable-volume chamber and having an outlet passage interconnecting said chamber to said cavity;
a hopper having a storage space with an outlet passage connecting to said cylinder chamber;
a rotatable device mounted in said hopper for stirring material disposed in said storage space and for urging a portion thereof through said outlet passage into said cylinder chamber; and
means for operating said rotatable device, in which said mold block comprises:
a pair of spaced fixed end plates; and
an intermediate plate having an opening extending transversely therethrough and disposed between said end plates so that said plates together form a closed-type mold cavity therebetween and slidable relative to said fixed plates from a closed position to an open position exposing said opening for removing a molded material from said cavity.

References Cited
UNITED STATES PATENTS

| | | | |
|---|---|---|---|
| 850,074 | 4/1907 | Streich | 107—15 |
| 2,770,202 | 11/1956 | Garfunkel | 107—15 |
| 2,805,053 | 9/1957 | Smith | 259—169 |
| 2,338,939 | 1/1944 | Holly | 17—32 |

WALTER A. SCHEEL, *Primary Examiner.*

J. SHEA, *Assistant Examiner.*